(No Model.) 2 Sheets—Sheet 2.
G. A. & D. R. STEDMAN.
HAY RAKING AND LOADING MACHINE.
No. 320,598. Patented June 23, 1885.
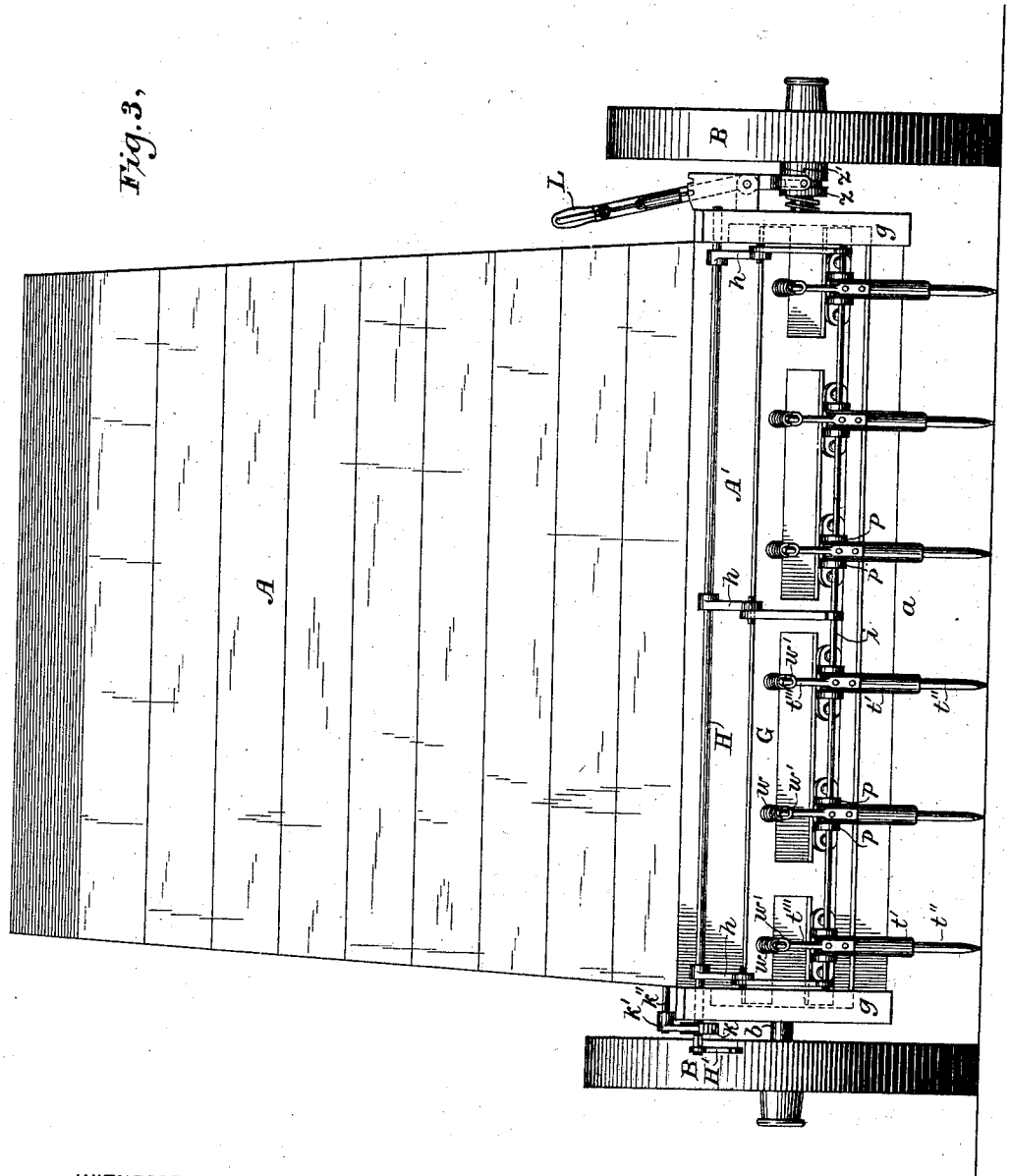
WITNESSES
Wm A. Skinkle
Jos. S. Latimer
INVENTORS
George A. Stedman
David R. Stedman
By their Attorney
Miller C. Earl

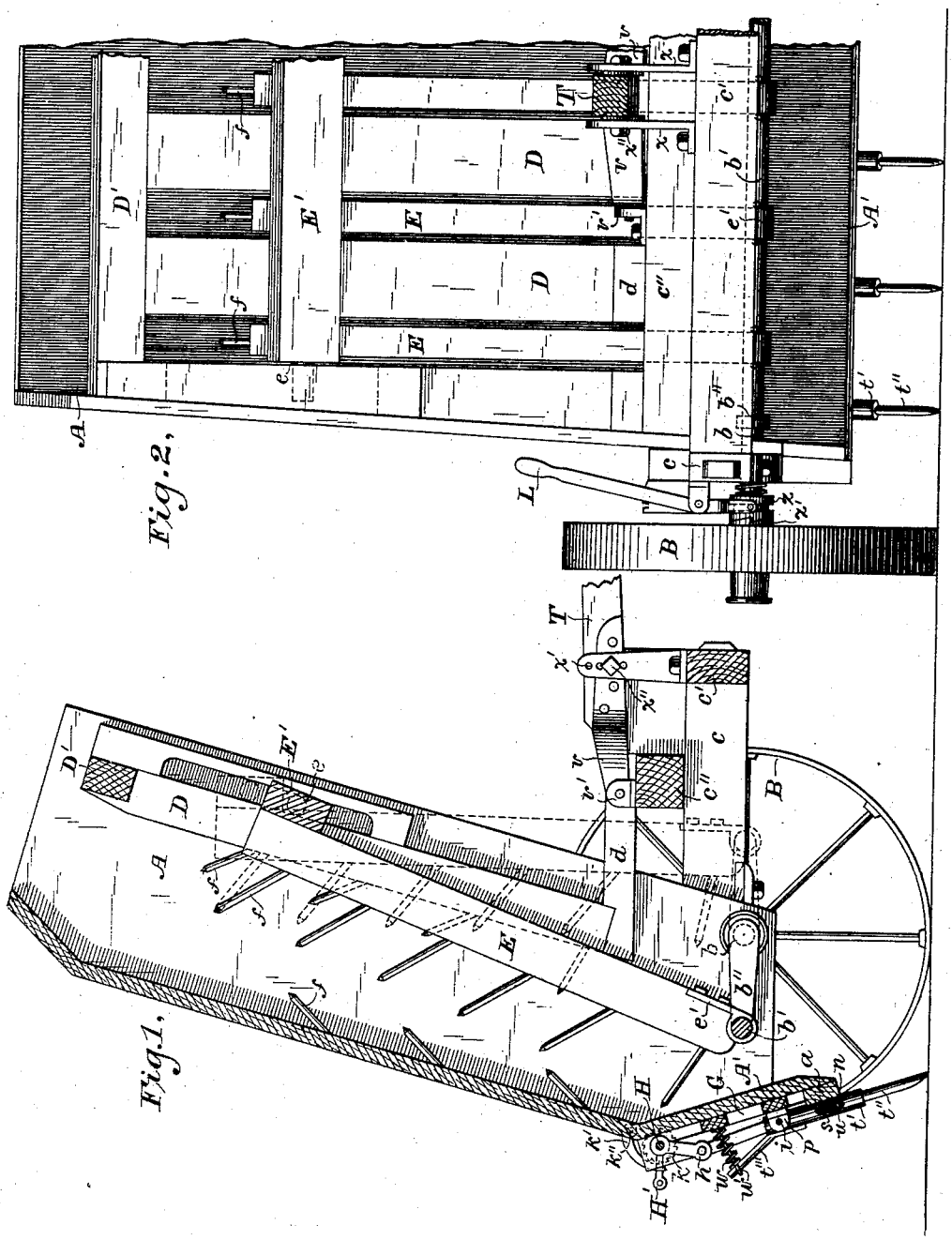

UNITED STATES PATENT OFFICE.

GEORGE A. STEDMAN, OF NEW YORK, N. Y., AND DAVID R. STEDMAN, OF ELIZABETH, NEW JERSEY, ASSIGNORS OF ONE-HALF TO ROBERT J. BOWEN, OF BERLIN, MARYLAND.

HAY RAKING AND LOADING MACHINE.

SPECIFICATION forming part of Letters Patent No. 320,598, dated June 23, 1885.

Application filed March 19, 1884. (No model.)

*To all whom it may concern:*

Be it known that we, GEORGE A. STEDMAN, of New York, in the county and State of New York, and DAVID R. STEDMAN, of Elizabeth, in the county of Union and State of New Jersey, citizens of the United States, have invented certain new and useful Improvements in Hay Raking and Loading Machines, of which the following is a specification.

Our invention relates to hay raking and loading machines which are adapted to be attached to the rear of the wagon to be loaded, and constructed to gather and carry the hay to the wagon as the latter is drawn over the field.

The first part of the invention consists, essentially, of a crank-axle connecting the carrying-wheels of the machine and turning with them, and a series of movable toothed bars for elevating or conveying the hay to the wagon, joined to the crank-axle and receiving their motion directly from it, whereby the hay may be caught up by the bars themselves from the ground in front of the rake.

The principal object attained by this portion of our invention is the simplifying of the machine in its construction and operation, since intervening toothed wheels or other mechanism for carrying the hay to the elevating-bars are dispensed with; and as the bars receive their motion directly from the axle of the carrying-wheels additional cams, band-wheels, or other devices for communicating the motion of the carrying-wheels to the elevating-bars are rendered unnecessary.

The invention further consists in features, hereinafter described and claimed, relating to the raking portion of the machine.

Referring to the accompanying drawings, Figure 1 is a transverse vertical section of a machine embodying our invention. Fig. 2 is a front elevation of the same, a portion of the machine being represented as broken away; and Fig. 3 is a rear elevation of the machine.

A is an upright chute, which may be constructed of wood, and which is carried upon the wheels B. Referring to Figs. 1 and 2, the chute is secured to the bars $c$ at its sides, and these bars are united together in front of the chute by the cross-bar $c'$. The front of the chute consists of a series of upright bars, D, secured at their upper ends to the cross-piece D', which cross-piece is rigidly secured at its ends to the sides of the chute. The bars D are secured at their lower ends to one of the ends of the horizontal bars $d$, which latter bars are firmly united at their opposite extremities to the beam $c''$, which beam extends across the space between the bars $c$, and is secured to said bars by bolts or otherwise.

The carrying-wheels B, upon which the machine is mounted, are rigidly connected with the axle $b$, so as to cause the same to rotate with them. The axle $b$ turns in suitable bearings in the bars $c$, and is formed with an eccentric or cranked portion, $b'$, extending across the space between the bars $c$. This portion $b'$ is joined to the portions of the axle which turn in the bearings in said bars by means of crank-arms $b''$, as shown.

A second series of upright bars, E, are arranged upon the front side of the chute between the bars D, and are united together at their upper ends by a cross-bar, E'. The cross-bar E' is provided with projecting studs $e$ upon its ends, which studs are adapted to travel in guideways at the sides of the chute, as shown. The lower ends of the bars E are connected to the eccentric portion of the axle $b$ by the eyes $e'$ upon the ends of said bars, as shown.

The bars D and E and the back of the chute A are all provided with projecting and upwardly-inclined teeth or pins $f$, the teeth on the bars E serving to elevate the hay within the chute, and those on the bars D and chute A acting to prevent the hay from descending in the chute when the teeth upon the bars E are disengaged from the hay. When, therefore, the machine is drawn upon its wheels over the field, the rotation of the axle $b$ will cause the bars E to slide up and down in the guideways at the sides of the chute, and to catch up or grasp the hay in front of the rake and carry it into and through the chute in their upward movements, and in their downward movements the bars will recede from the interior of the chute and disengage themselves from the hay.

The lower portion of the back of the chute A is preferably constructed to extend forward at an angle to the main portion of the chute, as shown at A' in Fig. 1, for readily guiding the hay to the interior of the chute as the machine is drawn along.

A rake-head consisting of the frame G, (best seen in Fig. 3,) for carrying the rake-teeth, is arranged to slide up and down in vertical guideways at the edges of the portion A' of the chute. These guideways may consist of grooves formed in the inner sides of the cleats $g$ $g$, nailed or otherwise secured to the edges of the chute, as shown. A rock-shaft, H, is supported at its ends in bearings formed in the upper ends of the cleats $g$ $g$, and is connected by crank-arms and links $h$ with the rod $i$ on the rake head G, upon which rod the rake-teeth may be secured. The said crank-arms are rigidly united to the rock-shaft, so as to be carried with it in its rocking. A lever, H', is fixed to the end of the rock-shaft, by the turning of which lever toward the chute the rock-shaft may be turned and the crank-arms and links made to raise the rake-head G, and the rake-teeth thus be raised above the ground. A ratchet-wheel, $k$, is fixed to the rock-shaft H, so as to turn with it. A hooked pawl, $k'$, is pivoted above the ratchet-wheel to an arm, $k''$, and is adapted to engage with the ratchet-wheel and prevent the turning of the same and the rock shaft in a direction away from the pawl. The pawl and ratchet thus serve to hold the rake-teeth in the desired vertical position, which position may be changed by means of the lever H', as will be readily understood from Figs. 1 and 3.

The rake-teeth which we prefer to employ are shown at $t$, and each consists of two sections, $t'$ $t''$, the section $t'$ being tubular and pivoted to the rod $i$. The other section, $t''$, of the tooth may be of wood or metal, and is fitted within the tubular section $t'$ so that it may slide longitudinally or telescope in it. The section $t''$ is normally held in an extended position by means of a spiral spring, $s$, inclosed within the tubular section $t'$. A pin, $n$, is secured to the section $t''$, and projects through a slot, $u$, in the tubular section $t'$ and prevents the detachment of the two sections. Each of the teeth $t$ is provided with an arm, $t'''$, rigidly attached to the upper end of the section $t'$, as shown. Stout metallic staples $w'$ are fastened to the rake-head G, and through the looped ends of these staples the arms $t'''$ extend, as shown. Spiral springs $w$ surround the staples $w'$ and extend between the arms $t'''$ and the rake-head G, and thus tend to maintain the teeth $t$ against the cleat $a$, which is fastened to the lower edge of the chute. The rod $i$, upon which the teeth $t$ are pivoted, extends through perforations in the angular brackets $p$. These brackets are secured to the rake-head G at the sides of the teeth $t$, as shown. By means of the springs $s$ and $w$ each of the teeth will be normally held in the position shown in the drawings, and in proper position for raking; but in the event of the teeth striking against obstructions—such as stones, unevenness in the ground, &c.—in passing over the field, the spring $s$ will allow the section $t''$ of the tooth to longitudinally yield, while the spring $w$ will allow the entire tooth to yield and turn backward upon its pivot, and thus pass over the obstruction without danger of the tooth being broken or damaged.

A tongue, T, for attaching the machine to the wagon to be loaded, is secured to the machine by metal arms $v$ $v$, attached at one of their ends to the sides of the tongue, and pivoted at their other ends to angular supports $v'$ on the cross-bar $c''$. We prefer to mount upright standards $x$ $x$ upon the bar $c'$ upon each side of the tongue. A vertical series of holes, $x'$, are formed in the standards $x$ $x$, and through these holes a bolt, $x''$, extends, which bolt also passes through a hole in the tongue. The tongue may therefore be adjusted up or down upon its pivots by changing the bolt $x''$ from one to another of the holes $x'$ in the uprights $x$ $x$. The tongue is thus rendered capable of being attached to wagons at different heights without the vertical position of the rake-teeth or the inclination of the chute being altered.

One of the wheels B may preferably be provided with means for disengaging it from rigid connection with the axle $b$ and allowing the wheel to turn independently upon the axle, so that in turning the machine from a straight course both of its wheels may rotate, instead of one of them being caused to slip over the ground, as would be the case if both wheels were rigidly united to the axle in a permanent manner. For this purpose we have illustrated one of the well-known devices employed in connection with the wheels and axles of mowing-machines, which device consists of a notched sleeve, $z$, on the axle, adapted to normally engage with a similarly-notched face upon the hub of the wheel, the sleeve being adapted to be disengaged from the hub of the wheel by suitable lever mechanism operating in a manner well understood.

The levers L and H' may be provided with ropes passing over pulleys on the chute to the wagon, and be operated by means of said cords by the person on the wagon, if desired.

What we claim herein as our invention is—

1. The combination, in a hay-loading machine, of carrying-wheels, a crank-axle uniting and rotating with them, and a series of toothed reciprocating bars for elevating the hay, joined to said axle and receiving their motion directly therefrom, substantially as shown and described.

2. The combination, in a hay-loading machine, of carrying-wheels, a crank-axle uniting and rotating with them, a chute through which the hay is elevated, and a series of toothed reciprocating bars joined to said axle and receiving their motion directly therefrom, and arranged to feed the hay through said chute, substantially as shown and described.

3. In a hay-loading machine, the combination of the carrying-wheels, the crank-axle uniting and rotating with them, the chute, the series of toothed reciprocating bars joined to said axle at their lower extremities and receiving their motion directly therefrom, and at their upper ends joined together and adapted to travel in guideways at the sides of said chute, substantially as set forth.

4. The combination of a series of rake-teeth, a rake-head upon which they are mounted, and which is arranged to travel in bearings or guideways, a rock-shaft, and crank-arms and links uniting said rake-head with the rock-shaft, the crank-arms being fixedly joined to the latter, whereby the turning of the rock-shaft will cause said rake-head to travel in its bearings, substantially as set forth.

5. The combination of the series of rake-teeth, the rake-head arranged to travel in bearings or guideways, the rock-shaft, the crank-arms and links uniting the rake-head with the rock-shaft, the ratchet fixed to the rock-shaft, and the pawl engaging with said ratchet, substantially as set forth.

GEORGE A. STEDMAN.
DAVID R. STEDMAN.

Witnesses to the signature of George A. Stedman:
MILLER C. EARL,
MARION H. KERNER.

Witnesses to the signature of David R. Stedman:
MILLER C. EARL,
GEORGE B. HOOKER.